United States Patent [19]

Chan

[11] Patent Number: 5,528,689
[45] Date of Patent: Jun. 18, 1996

[54] TELEPHONE HEADSET ADAPTOR INCLUDING A HEARING SOUND TUBE, A SPEAKING SOUND TUBE, A HEADSET, A TELEPHONE EAR CUP AND A TELEPHONE MOUTH CUP

[76] Inventor: Alex Y. Chan, 2021 Pennington Dr., Arlington, Tex. 76014

[21] Appl. No.: 334,942

[22] Filed: Nov. 7, 1994

[51] Int. Cl.⁶ .................................................. H04M 1/00
[52] U.S. Cl. ............................................................. 379/430
[58] Field of Search .................................. 379/430, 433, 379/452; 381/183, 187

[56] References Cited

U.S. PATENT DOCUMENTS

| | | | |
|---|---|---|---|
| 299,300 | 5/1884 | Warth | 379/430 |
| 1,052,162 | 2/1913 | McCausland | 379/452 |
| 3,621,156 | 11/1971 | Kliewer | 379/430 |
| 4,090,042 | 5/1978 | Larkin | 379/430 |

*Primary Examiner*—Jeffery Hofsass
*Assistant Examiner*—Jack Chiang

[57] ABSTRACT

An adaptor for converting a hand-held telephone into a headset telephone. The inventive device includes a headset wearable by an individual for audibly coupling an individual's ear and mouth to a pair of sound tubes. The sound tubes extend from the headset to removably couple with a hand-held telephone, whereby sound is transmitted between the headset and the telephone through the sound tubes. The present invention serves to permit a hands-free utilization of the associated cellular phone, and further to place the cellular phone a greater distance from the user's head to reduce exposure to potentially hazardous radiation generated by the cellular phone.

1 Claim, 3 Drawing Sheets

TELEPHONE HEADSET ADAPTOR INCLUDING A HEARING SOUND TUBE, A SPEAKING SOUND TUBE, A HEADSET, A TELEPHONE EAR CUP AND A TELEPHONE MOUTH CUP

BACKGROUND OF THE INVENTION

1. Field of the Invention

The present invention relates to telephone structures and more particularly pertains to a telephone headset adaptor for converting a hand-held telephone into a headset telephone.

2. Description of the Prior Art

The use of telephone structures is known in the prior art. More specifically, telephone structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art telephone structures include U.S. Pat. No. 3,667,569; U.S. Pat. No. 3,539,031; U.S. Pat. No. 5,177,784; U.S. Pat. No. 4,754,484; and U.S. Pat. No. 4,617,431.

While these devices fulfill their respective, particular objectives and requirements, the aforementioned patents do not disclose a telephone headset adaptor for converting a hand-held telephone into a headset telephone which includes a headset wearable by an individual for audibly coupling an individual's ear and mouth to a pair of sound tubes, with the sound tubes extending from the headset to removably couple with a hand-held telephone, whereby sound is transmitted between the headset and the telephone through the sound tubes.

In these respects, the telephone headset adaptor according to the present invention substantially departs from the conventional concepts and designs of the prior art, and in so doing provides an apparatus primarily developed for the purpose of converting a hand-held telephone into a headset telephone.

SUMMARY OF THE INVENTION

In view of the foregoing disadvantages inherent in the known types of telephone structures now present in the prior art, the present invention provides a new telephone headset adaptor construction wherein the same can be utilized for converting a hand-held telephone into a headset telephone. As such, the general purpose of the present invention, which will be described subsequently in greater detail, is to provide a new telephone headset adaptor apparatus and method which has many of the advantages of the telephone structures mentioned heretofore and many novel features that result in a telephone headset adaptor which is not anticipated, rendered obvious, suggested, or even implied by any of the prior art telephone structures, either alone or in any combination thereof.

To attain this, the present invention generally comprises an adaptor for converting a hand-held telephone into a headset telephone. The inventive device includes a headset wearable by an individual for audibly coupling an individual's ear and mouth to a pair of sound tubes. The sound tubes extend from the headset to removably couple with a hand-held telephone, whereby sound is transmitted between the headset and the telephone through the sound tubes. The present invention serves to permit a hands-free utilization of the associated cellular phone, and further to place the cellular phone a greater distance from the user's head to reduce exposure to potentially hazardous radiation generated by the cellular phone.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new telephone headset adaptor apparatus and method which has many of the advantages of the telephone structures mentioned heretofore and many novel features that result in a telephone headset adaptor which is not anticipated, rendered obvious, suggested, or even implied by any of the prior art telephone structures, either alone or in any combination thereof.

It is another object of the present invention to provide a new telephone headset adaptor which may be easily and efficiently manufactured and marketed.

It is a further object of the present invention to provide a new telephone headset adaptor which is of a durable and reliable construction.

An even further object of the present invention is to provide a new telephone headset adaptor which is susceptible of a low cost of manufacture with regard to both materials and labor, and which accordingly is then susceptible of low prices of sale to the consuming public, thereby making such telephone headset adapters economically available to the buying public.

Still yet another object of the present invention is to provide a new telephone headset adaptor which provides in the apparatuses and methods of the prior art some of the advantages thereof, while simultaneously overcoming some of the disadvantages normally associated therewith.

Still another object of the present invention is to provide a new telephone headset adaptor for converting a hand-held telephone into a headset telephone.

Yet another object of the present invention is to provide a new telephone headset adaptor which includes a headset wearable by an individual for audibly coupling an individual's ear and mouth to a pair of sound tubes, with the sound tubes extending from the headset to removably couple with a hand-held telephone, whereby sound is transmitted between the headset and the telephone through the sound tubes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
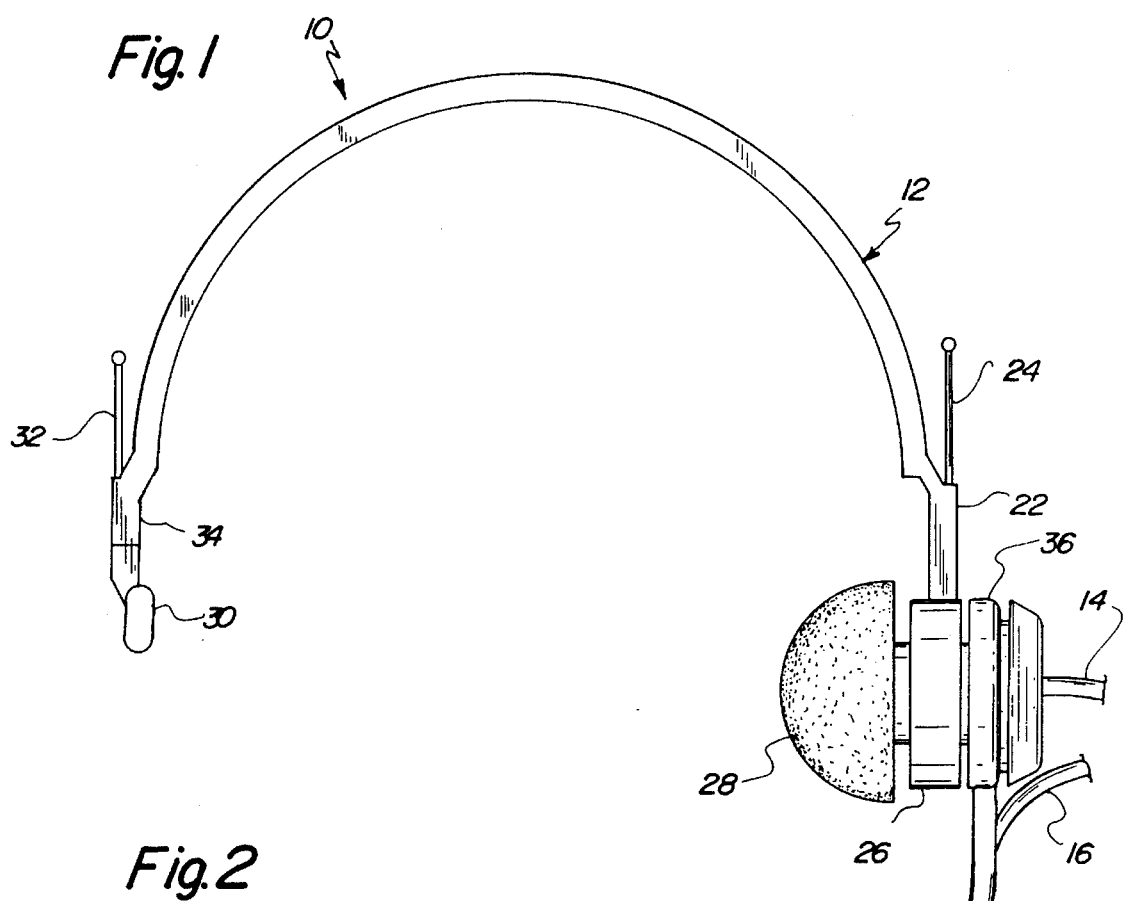
FIG. 1 is a front elevation view of a telephone headset adaptor according to the present invention.
Figure 2:
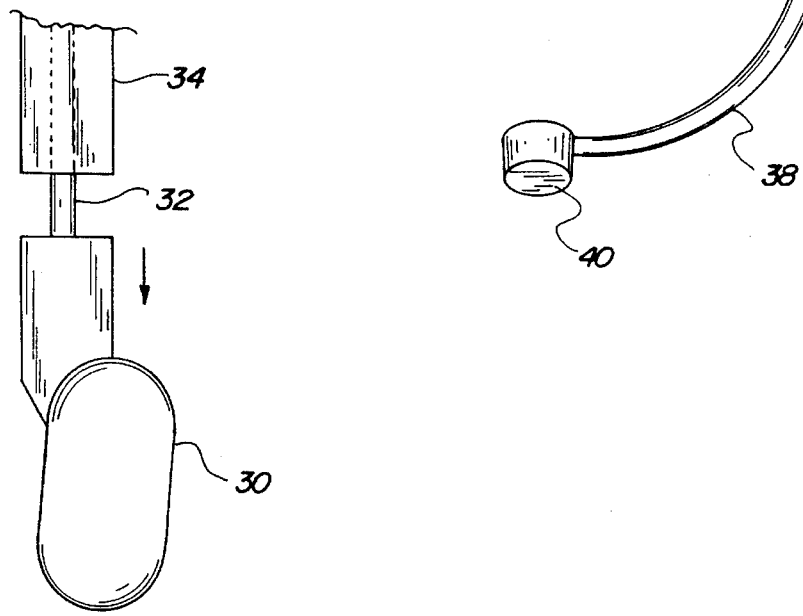
FIG. 2 is an enlarged front elevation view of a portion of the present invention.

With reference now to the drawings, and in particular to FIGS. 1–6 thereof, a new telephone headset adaptor embodying the principles and concepts of the present invention and generally designated by the reference numeral 10 will be described.

Figure 4:
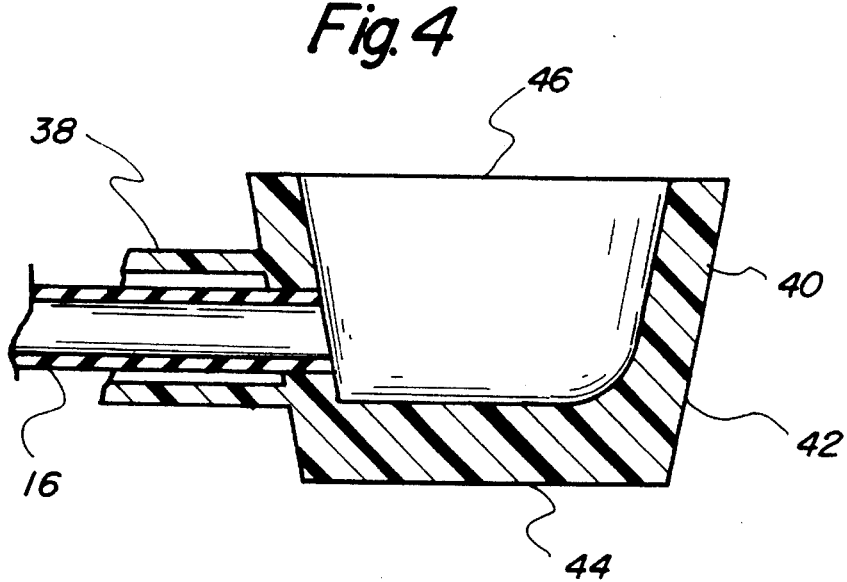
FIG. 4 is a cross-section view taken along line 4—4 of FIG. 3.
Figure 5:
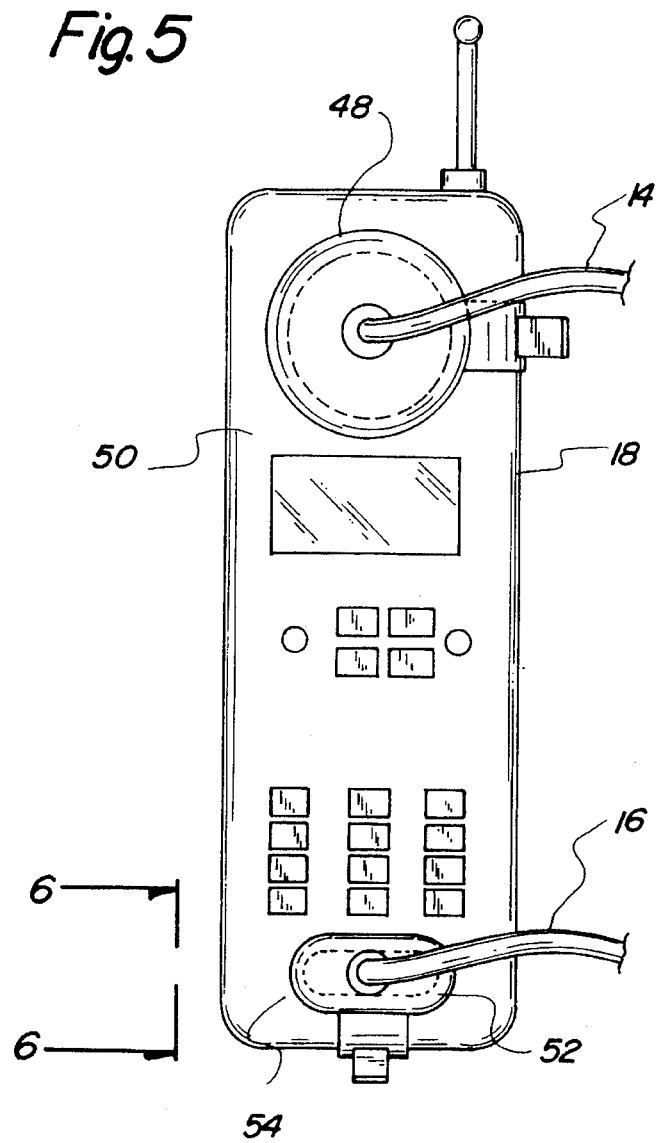
FIG. 5 is a front elevation view of a portion of the present invention as coupled to a hand-held telephone.

More specifically, it will be noted that the telephone headset adaptor 10 comprises a headset means 12 wearable upon a head of an individual for audibly coupling an individual's ear to a hearing sound tube 14 and further for audibly coupling an individual's mouth to a speaking sound tube 16. As shown in FIG. 5, the hearing sound tube 14 and the speaking sound tube 16 extend from the headset means 12 to couple with a hand-held telephone 18 by structure which will subsequently be described in more detail. As best illustrated in FIGS. 1 through 4, the headset means 12 of the present invention 10 comprises a substantially arcuate headband 20 positionable transversely across the upper portion of an individual's head. The headband 20 includes a proximal end 22 through which an extension rod 24 is directed. The extension rod 24 is slidably positionable relative to the proximal end 22 and is retained in a desired position through a frictional engagement between the extension rod 24 and the proximal end of the headband 20. The extension rod 24 projects through the proximal end 22 to couple with an earpiece 26. By this structure, the earpiece 26 can be selectively adjusted relative to the headband 20 through a movement of the extension rod 24 through the proximal end 22 thereof. The earpiece 26 is substantially hollow and is in audio communication with the hearing sound tube 14 at a first end of the earpiece, with an ear pad 28 being coupled to a second end of the earpiece and positioned for engagement against an exterior of the individual's ear when the headset means 12 is donned by such an individual.

In a manner similar to the mounting of the earpiece 26 to the proximal end 22 of the headband 20, a head pad 30 is mounted to an extension rod 32 extending through a distal end 34 of the headband 20. The extension rod 32 is movably mounted relative to the distal end 34 of the headband 20 and permits adjustment of the head pad 30 relative thereto. Similarly, frictional engagement between the extension rod 32 and the distal end 34 of the headband 20 retains the head pad in a desired orientation. By this structure, the headband can be positioned over an individual's head so as to position the ear pad 28 proximal to the individual's ear for communication through the earpiece 26 with the hearing sound tube 14, while the head pad 30 is positioned on a diametrically opposed side of the individual's head and cooperates with the ear pad 28 to retain the headset means 12 relative to the individual's head.

Figure 3:
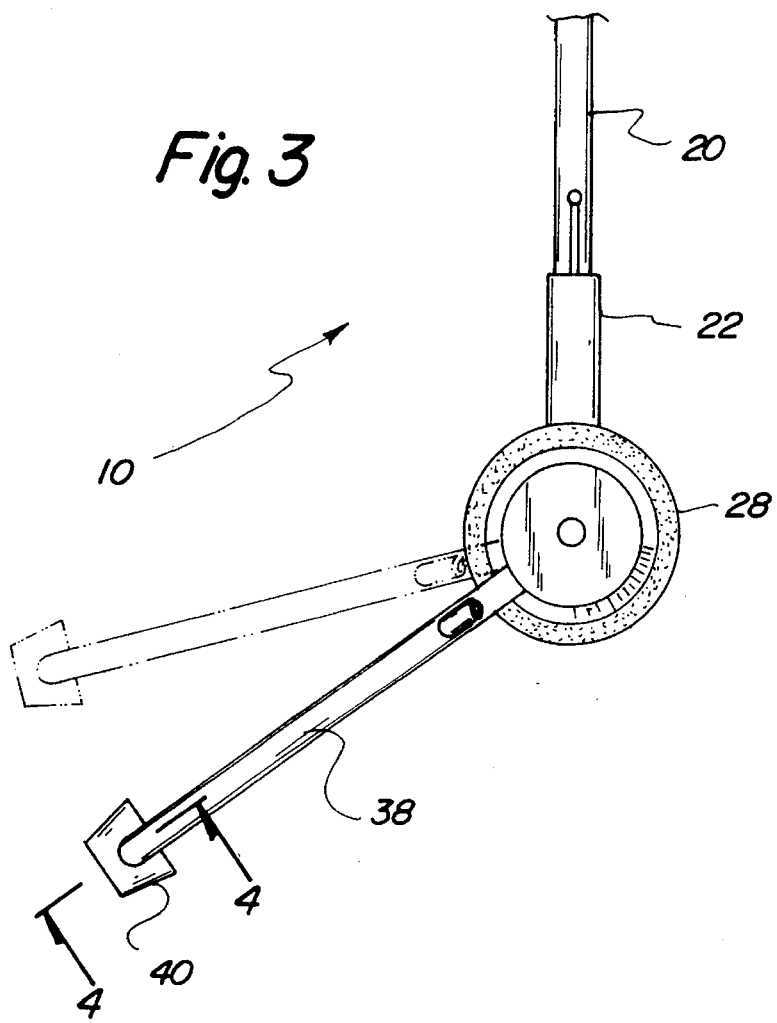
FIG. 3 is a side elevation view of the device.

With continuing reference to FIGS. 1 and 3, it can be shown that the headset means 12 further comprises a mounting boss 36 rotatably mounted to the earpiece 26. An arcuate support arm 38 is secured to the mounting boss 36 and extends downwardly and inwardly therefrom to terminate in a mouthpiece 40. The mounting boss 36 can be rotatably moved relative to the earpiece 26 to position the mouthpiece 40 in a desired orientation, wherein frictional engagement between the mounting boss 36 and the earpiece 26 retains such desired position. As shown in FIG. 4, the speaking sound tube 16 extends through the hollow arcuate support arm 38 to couple with the mouthpiece 40. The mouthpiece 40 is operable to receive sound emanating from an individual's mouth and direct such audio sound through the sound tube 16. To this end, the mouthpiece 40 preferably comprises a truncated conical member 42 having a closed end 44 and an open end 46. By this structure, an individual speaking into the mouthpiece 40 will generate audio noises captured by the mouthpiece 40 and directed through the sound tube 16.

Figure 6:
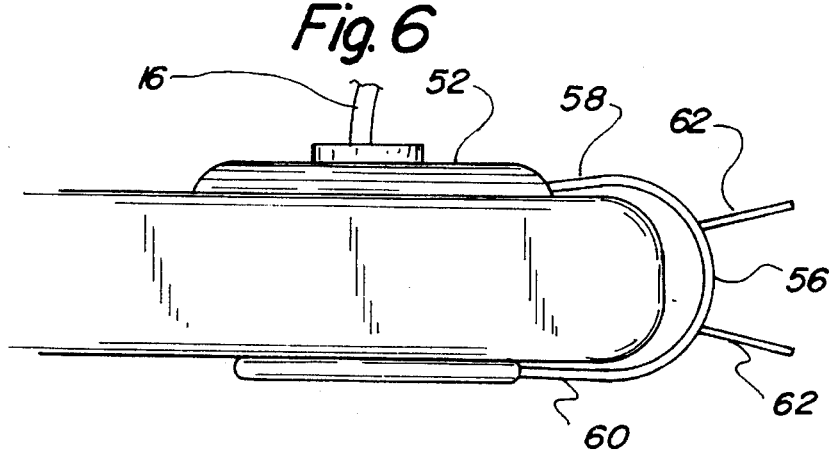
FIG. 6 is a side elevation view as seen from line 6—6 of FIG. 5.

FIGS. 5 and 6 illustrate a coupling of the headset means 12 through the associated telephone 18. To this end, the hearing sound tube 14 is coupled to a telephone ear cup 48 positionable over the ear portion 50 of the telephone 18. Similarly, the speaking sound tube 16 extends into communication with a telephone mouth cup 52 positionable over the mouth portion 54 of the telephone. To retain the telephone ear cup 48 and the telephone mouth cup 52 relative to the telephone 18, a clip structure is provided. As shown for only the telephone mouth cup 52 in FIG. 6, a substantially U-shaped clip 56 includes a first clip leg 58 coupled to the telephone mouth cup 52. The U-shaped clip 56 extends about the telephone 18 and continues into a second clip leg 60 which engages a back side of the telephone. The U-shaped clip 56 is formed of a substantially resilient material and includes a pair of projecting handle legs 62 extending outwardly therefrom. The handle legs 62 are operable to be biased together to open the U-shaped clip 56 for mounting or removal of the telephone mouth cup 52 relative to the telephone 18. By this structure, the telephone ear cup 48 and the telephone mouth cup 52 can be easily coupled to any size or shape of telephone 18. Although illustrated and described specifically for the telephone mouth cup 52, it is to be understood that the telephone ear cup 48 is provided with a substantially identical U-shaped clip.

In use, the ear cup 48 and the mouth cup 52 can be easily coupled to an associated hand-held telephone 18, with the headset means 12 being positionable over the head of an individual. Through this arrangement, audio sounds generated by the telephone 18 and directed through the ear portion 50 thereof will be transmitted through the hearing sound tube 14 and dispensed through the ear pad 28 of the earpiece 26 for reception within an individual's ear. Similarly, an individual speaking into the mouthpiece 40 will generate audio sound directed through the speaking sound tubes 16 and into the mouth portion 54 of the telephone 18. Thus, the telephone headset adaptor 10 permits the associated telephone 18 to be utilized in a substantially hands-free condition. Further, when the present invention 10 is utilized with a cellular phone or other radio frequency generating device, such phone can be positioned remotely relative to the individual's head, thereby reducing the effects of such radio frequency radiation or microwave radiation thereto.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A telephone headset adapter comprising:

a hearing sound tube;

a speaking sound tube;

a headset means positionable upon a head of an individual for audibly coupling an individual's ear to said hearing sound tube and further for audibly coupling an individual's mouth to said speaking sound tube, the headset means comprises a substantially arcuate headband positionable transversely across an upper portion of the individual's head, said headband including a proximal end and a distal end, a first extension rod slidably directed through said proximal end, an earpiece coupled to said first extension rod, said earpiece being substantially hollow and in audio communication with said hearing sound tube, the headset means having a second extension rod slidably directed through said distal end of said headband with a head pad coupled to said second extension rod, the headset means having a mounting boss rotatably mounted to said earpiece, a hollow arcuate support arm secured to said mounting boss and extending downwardly and inwardly therefrom, a mouthpiece coupled to said arcuate support arm, said speaking sound tube extending through said hollow arcuate support arm to audible couple with said mouthpiece, the mouthpiece having a truncated conical member having a closed end and an open end, with said speaking sound tube being directed through said truncated conical member;

a telephone ear cup audibly coupled to said hearing sound tube and positionable over an ear portion of a telephone handset;

a telephone mouth cup audibly coupled to said speaking sound tube and positionable over a mouth portion of said telephone handset;

a clip means for retaining said telephone ear cup and said telephone mouth cup relative to said telephone handset, the clip means comprises of a substantially U-shaped clip including a first clip leg engagable to a back side of said telephone handset, said U-shaped clip being formed of a substantially resilient material and including a pair of projecting handle legs are operable to be biased together to open said U-shaped clip for mounting and removal of said cups relative to said telephone handset.

* * * * *